US008125681B2

(12) United States Patent
Akahane

(10) Patent No.: US 8,125,681 B2
(45) Date of Patent: Feb. 28, 2012

(54) IMAGE FORMING APPARATUS AND THUMBNAIL IMAGE GENERATING METHOD

(75) Inventor: Tetsuya Akahane, Sagamihara (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 630 days.

(21) Appl. No.: 12/355,331

(22) Filed: Jan. 16, 2009

(65) Prior Publication Data

US 2009/0185224 A1 Jul. 23, 2009

(30) Foreign Application Priority Data

Jan. 22, 2008 (JP) ................. 2008-011452

(51) Int. Cl.
*G06F 15/00* (2006.01)
*G03F 3/10* (2006.01)
(52) U.S. Cl. ...................... 358/1.2; 358/527
(58) Field of Classification Search .................. 358/1.2, 358/500, 504, 1.9, 2.1, 448; 345/593, 418; 382/167, 214
See application file for complete search history.

(56) References Cited

U.S. PATENT DOCUMENTS

| 2002/0149578 | A1* | 10/2002 | Atkins | 345/418 |
| 2007/0008335 | A1* | 1/2007 | Bhattacharjya | 345/593 |
| 2007/0236753 | A1 | 10/2007 | Watanabe | |

FOREIGN PATENT DOCUMENTS

| JP | 2002-77803 | 3/2002 |
| JP | 2005-57598 | 3/2005 |
| JP | 2005-341382 | 12/2005 |
| JP | 2006-115000 | 4/2006 |
| JP | 2007-282215 | 10/2007 |

OTHER PUBLICATIONS

Notification of Reasons for Refusal with English language translation issued by the Japanese Patent Office on Oct. 25, 2011, in corresponding Japanese application No. 2008-011452.

* cited by examiner

Primary Examiner — Jerome Grant, II
(74) Attorney, Agent, or Firm — Finnegan, Henderson, Farabow, Garrett & Dunner, L.L.P.

(57) ABSTRACT

Disclosed is an image forming apparatus 100, comprising: an image processing section 10 to perform image processing for printing for CMYK image data which is obtained by a color conversion for the printing; a thumbnail image generating section 11 to generate thumbnail image data by using the CMYK image data; a memory 10e to store the CMYK image data; and a display section 18 to display a thumbnail image based on the thumbnail image data, wherein the thumbnail image generating section 11 performs reducing processing to reduce the CMYK image data, and conversion processing to convert the reduced CMYK image data to image data for displaying, so as to generate the thumbnail image data, in parallel with the image processing performed by the image processing section 10.

14 Claims, 4 Drawing Sheets

IMAGE FORMING APPARATUS AND THUMBNAIL IMAGE GENERATING METHOD

BACKGROUND OF THE INVENTION

1. Field of the Invention

The present invention relates to an image forming apparatus and a thumbnail image generating method.

2. Description of Related Art

In recent years, an image forming apparatus has become widely used, in which image data read from a document, image data obtained form an external terminal, and the like can be saved in the medium-to-long term. The saved image data is subjected to image forming at a desirable timing by an instruction operation of a user.

When a piece of image data is selected among the saved image data by a user, file names or thumbnail images of the available choices of image data are displayed in a display section which is attached to the image forming apparatus. The thumbnail image is an image used for reference which is generated by reducing the saved image data, or the like.

In a case where a large amount of image data is being saved, it is difficult for a user to judge the content of the image data when only the file names of pieces of image data are displayed. Accordingly, the judgment becomes easier by displaying the thumbnail images.

Generally, the generating processing of the thumbnail image is performed at a separate timing from the image processing of original image data of the thumbnail image. For example, first, the original image data is saved in a predetermined memory. Subsequently, the Central Processing Unit (CPU) accesses the memory to copy the original image data, and performs reducing processing, and the like, for the copied image data. Thus, the thumbnail image is generated. Further, while the thumbnail images are generated, the original image data is subjected to various processing such as image processing, and the like.

In the generating processing of the thumbnail images performed in the above described manner, the larger the data amount of the thumbnail images is, the longer the time for generating processing thereof is to be spent. Further, there may be a case where the image processing and the like of the original image data take time, due to the generating processing of the thumbnail images.

Considering the fact that the thumbnail images are used for assisting the original image data, it is preferable to reduce the time spent for the generating processing of the thumbnail images as much as possible. Further, when the generating processing of the thumbnail images is performed, it is necessary that processing of the original image data should not be influenced by the generating processing of the thumbnail images.

In order to solve the problems caused by generating the thumbnail images, the following techniques described in Japanese Patent Application Laid-Open Publication No. 2002-77803, Japanese Patent Application Laid-Open Publication No. 2005-341382, and Japanese Patent Application Laid-Open Publication No. 2006-115000 are disclosed.

According to Japanese Patent Application Laid-Open Publication No. 2002-77803, disclosed is a video information recording apparatus to create thumbnail images when video data which is once recorded in a memory is encoded (performed with compression processing and the like). Thereby, the time for creating the thumbnail images needed when reproducing/editing the video data is no longer necessary.

Further, according to Japanese Patent Application Laid-Open Publication No. 2005-341382, disclosed is an image processing apparatus to perform generating processing of thumbnail images in parallel with compression and recording processing of input image data. Thereby, the generating processing of the thumbnail images need not be separately performed after the photographing of the images. Thus, the time spent separately for the generating processing of the thumbnail images is no longer necessary, in the same manner as the disclosure of Japanese Patent Application Laid-Open Publication No. 2002-77803.

Moreover, according to Japanese Patent Application Laid-Open Publication No. 2006-115000, disclosed is an image processing apparatus comprising a plurality of memories, in which the generating processing of the thumbnail images is performed in a predetermined memory, whichever memory the original compression image data of the thumbnail image may be saved in. Thereby, the generating processing of the thumbnail images and the processing of a job with higher priority are not performed at the same time in the same memory. Thus, hindering the processing of the job with higher priority by the generating processing of the thumbnail images can be prevented.

However, according to the technique disclosed in Japanese Patent Application Laid-Open Publication No. 2002-77803, the video data is once recorded in the memory. Accordingly, the memory in which the video data is recorded needs to be accessed when generating the thumbnail images, thus the processing time for accessing is required.

Further, according to the technique disclosed in Japanese Patent Application Laid-Open Publication No. 2005-341382, the thumbnail images are generated in parallel with the processing in which the image data is recorded in the memory, thus the problem caused in Japanese Patent Application Laid-Open Publication No. 2002-77803 may be solved.

However, the technique disclosed in Japanese Patent Application Laid-Open Publication No. 2005-341382 is applied for generating thumbnail images especially for moving images, and fails to disclose the applicability for a still image for printing. For example, in order to generate a thumbnail image for a still image for printing comprising a plurality of colors, it is necessary that the thumbnail image is generated in consideration of the image data of each of the colors of C (cyan), M (magenta), Y (yellow), and K (black), and that the generated thumbnail image is displayed in the display section.

Moreover, according to Japanese Patent Application Laid-Open Publication No. 2006-115000, although the generating processing of the thumbnail image for a still image is disclosed, reducing the time spent for the generating processing of the thumbnail image is not disclosed.

SUMMARY OF THE INVENTION

It is an object of the present invention to provide an image forming apparatus and method by which a thumbnail image of a still image comprising a plurality of colors can efficiently be generated.

To achieve the above described object, according to a first aspect of the present invention, there is provided an image forming apparatus, comprising:

an image processing section to perform image processing for printing for CMYK image data which is obtained by a color conversion for the printing;

a thumbnail image generating section to generate thumbnail image data by using the CMYK image data;

a memory to store the CMYK image data; and a display section to display a thumbnail image based on the thumbnail image data, wherein the thumbnail image generating section performs reducing processing to reduce the CMYK image data, and conversion processing to convert the reduced CMYK image data to image data for displaying, so as to generate the thumbnail image data, in parallel with the image processing performed by the image processing section.

Further, according to a second aspect of the present invention, there is provided a thumbnail image generating method, comprising:

performing image processing for printing for CMYK image data which is obtained by a color conversion for the printing;

generating thumbnail image data by performing reducing processing to reduce the CMYK image data, and conversion processing to convert the reduced CMYK image data to image data for displaying, in parallel with the image processing;

storing the CMYK image data in a memory; and displaying a thumbnail image in a display section based on the thumbnail image data.

BRIEF DESCRIPTION OF THE DRAWINGS

The present invention will be more completely understood from the following detailed descriptions of the embodiment and the attached drawings. However, these embodiment and the drawings are not intended to limit the scope of the present invention, wherein.

DETAILED DESCRIPTION OF THE PREFERRED EMBODIMENT

In the following, an embodiment of an image forming apparatus and a thumbnail image generating method according to the present invention will be described with reference to the drawings.

Figure 1:
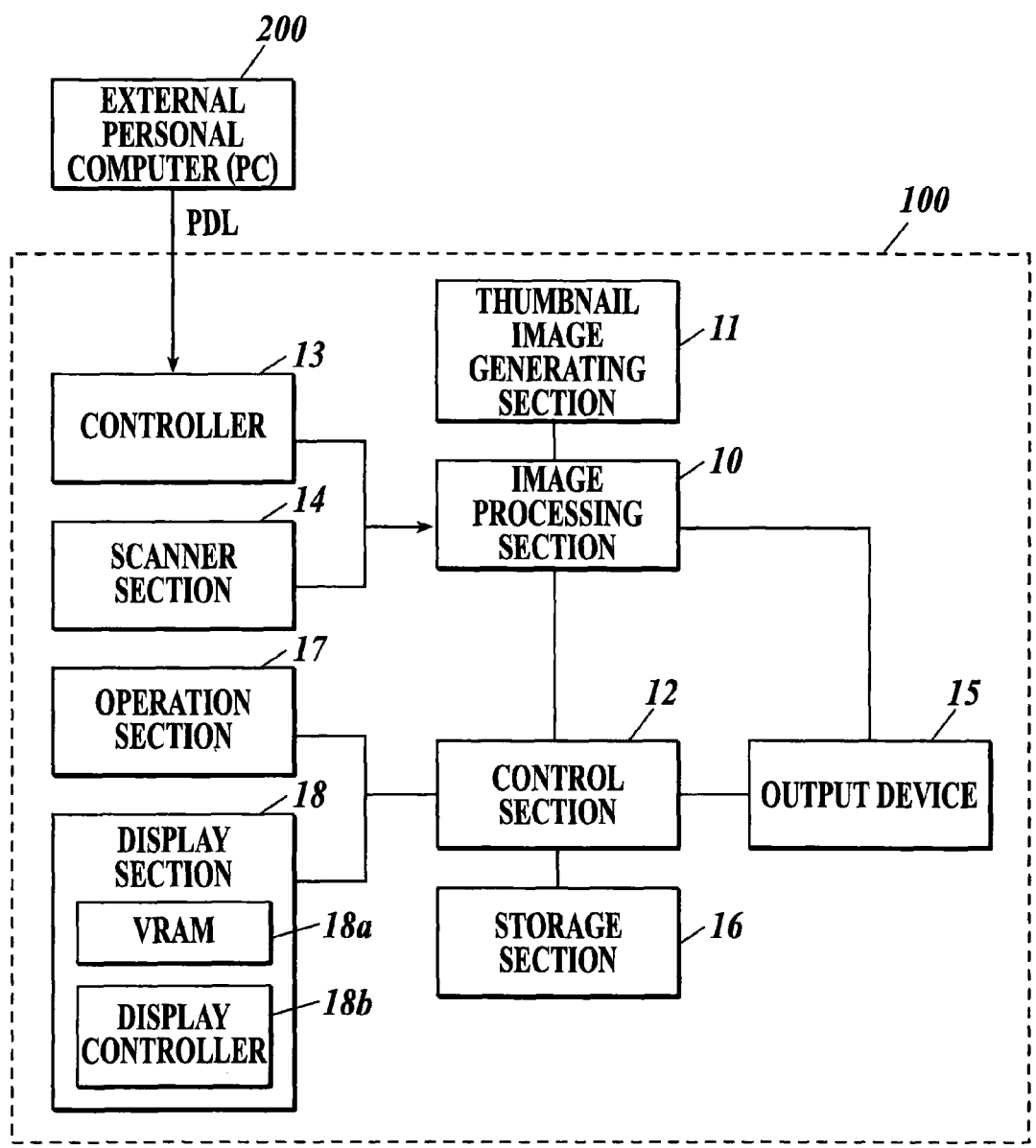
FIG. 1 is a functional block diagram showing the overall configuration of an image forming apparatus.

First, an image forming apparatus 100 according to the present embodiment will be described with reference to FIG. 1.

The image forming apparatus 100 comprises an image processing section 10, a thumbnail image generating section 11, a control section 12, a controller 13, a scanner section 14, an output device 15, a storage section 16, an operation section 17, and a display section 18.

Further, the image forming apparatus 100 is connected to an external personal computer (PC) 200 so that data in a page description language (PDL) format transmitted from the external PC 200 is converted to image data. Then, the image forming apparatus 100 performs image processing and printing processing of the converted image data.

Hereinbelow, flow of the printing processing and each section of the image forming apparatus 100 are described.

The image forming apparatus 100 performs the printing processing in the following procedures. Incidentally, the printing processing mainly comprises two cases, which are a case where the image data is output from the controller 13, and a case where the image data is output from the scanner section 14.

In the case where the image data is output from the controller 13, first, an application inside of the external PC 200 outputs data of a document to be printed to printer driver software inside of the external PC 200.

The printer driver software converts the document data to the PDL format, and transmits the converted data from the external PC 200 to the controller 13.

The controller 13 rasterizes the document data converted to the PDL format so as to generate CMYK image data. The CMYK image data is image data for printing which comprises four of the plurality of colors, which are C (cyan), M (magenta), Y (yellow), and K (black). Then, the controller 13 outputs the CMYK image data to the image processing section 10.

On the other hand, in the case where the image data is output from the scanner section 14, first, the document is read by an optical system (not shown) of the scanner section 14 to generate analog image data. Then, the generated analog image data is subjected to an analog/digital (A/D) conversion so that RGB image data comprising three colors which are R (red), G (green), and B (blue), is generated. Thus, the generated RGB image data is output to the image processing section 10. Incidentally, the RGB image data is applied for displaying usage.

In the image processing section 10, various image processing is performed for the CMYK image data output from the controller 13, or the RGB image data output from the scanner section 14. Incidentally, the RGB image data output from the scanner section 14 is converted to the CMYK image data, that is to say, the image data for printing, so as to be subjected to the image processing.

The processing in the image processing section 10 will be described later in the description of FIG. 2.

In the output device 15, the CMYK image data which has been subjected to the image processing by the image processing section 10 is received, and the printing processing according to a control signal from the control section 12 is performed for the received CMYK image data.

Hereinbelow, the printing processing is described.

The output device 15 performs the printing processing by an electrophotographic method. The output device 15 comprises, for example, a feeding unit to house the printing sheets, an exposing unit having a photoconductive drum, a developing unit to attach toners, a fixing unit to fix the toners, and the like (all of which are not shown).

In the output device 15, an electrostatic latent image is formed by irradiating the photoconductive drum with a laser beam or the like in the exposing unit, based on the image data to be printed. Then, the toners are attached by the developing unit. Subsequently, the toner image formed on the photoconductive drum is transferred to the printing sheet fed from the feeding unit, and the transferred toner image is fixed by the fixing unit. After the toner image is fixed, the printing sheet is ejected to an ejection tray or the like, thus the printing processing is terminated.

The storage section 16 stores system programs, various control programs, and the like. The various programs stored in the storage section 16 are read by the control section 12, so that operations of each section are controlled in a centralized manner.

The operation section 17 is one for the user to input an operation instruction. The operation section 17 comprises various keys, a touch panel which is integrally configured with the display section 18, and the like. The operation section 17 generates operation signals according to the operations to output the generated operation signals to the control section 12.

The display section 18 comprises a video random access memory (VRAM) 18a, a display controller 18b, and the like. The display section 18 displays an operation screen and the like on the display according to the control signal of the control section 12.

Further, the display section 18 displays the thumbnail image based on the thumbnail image data which is generated by the image processing section 10 and is written in the VRAM 18a, on the display as a preview. On this occasion, the thumbnail image data is once stored in the VRAM 18a, and the thumbnail image based thereon is to be displayed on the display through the display controller 18b.

Figure 2:
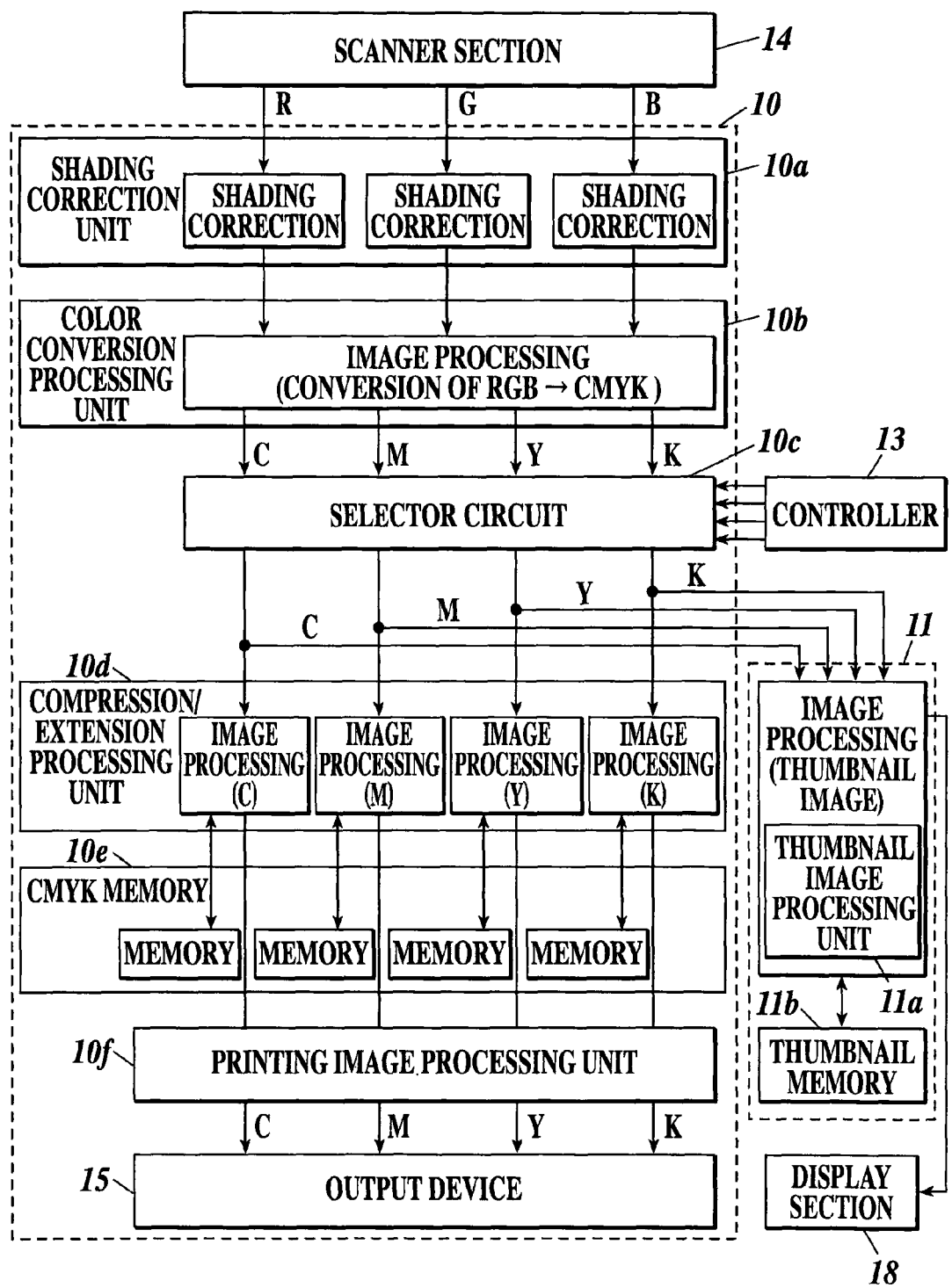
FIG. 2 is a functional block diagram of an image processing apparatus.

Next, with reference to FIG. 2, the image processing section 10 and the thumbnail image generating section 11 are described. The image processing section 10 comprises a shading correction unit 10a, a color conversion processing unit 10b, a selector circuit 10c, a compression/extension processing unit 10d, a CMYK memory 10e, and a printing image processing unit 10f. Further, the thumbnail image generating section 11 comprises a thumbnail image processing unit 11a, and a thumbnail memory 11b.

Hereinbelow, processing of each of the sections after the image processing section 10 receives the RGB image data output from the scanner section 14, is described.

The shading correction unit 10a corrects the brightness unevenness for the RGB image data so that image data of each of the colors is performed with a shading correction.

The shading correction unit 10a outputs the RGB image data to the color conversion processing unit 10b after the shading correction is performed when the RGB image data is received, the color conversion processing unit 10b performs conversion processing to convert the received RGB image data to the CMYK image data.

After the RBG image data is converted to the CMYK image data, the color conversion processing unit 10b outputs the CMYK image data to the selector circuit 10c.

The selector circuit 10c outputs either one of the CMYK image data from the scanner section 14 and the CMYK image data from the controller 13 both of which are described above, to the compression/extension processing unit 10d and to the thumbnail image generating section 11.

On this occasion, the selector circuit 10c outputs the CMYK image data to the thumbnail image generating section 11 in a state of being synchronized with a synchronizing signal of the CMYK image data output to the compression/extension processing unit 10d.

After the image data of each of the colors of CMYK is received, the compression/extension processing unit 10d performs compression processing for the image data of each of the colors to output the compressed image data of each of the colors to the CMYK memory 10e, the memory being assigned for each of the colors.

Further, when the CMYK image data is received, the thumbnail image generating section 11 performs predetermined processing in the thumbnail image processing unit 11a to generate the thumbnail image data. Then, the thumbnail image generating section 11 outputs the generated thumbnail image data to the thumbnail memory 11b which is dedicated to the thumbnail image data.

Figure 3:
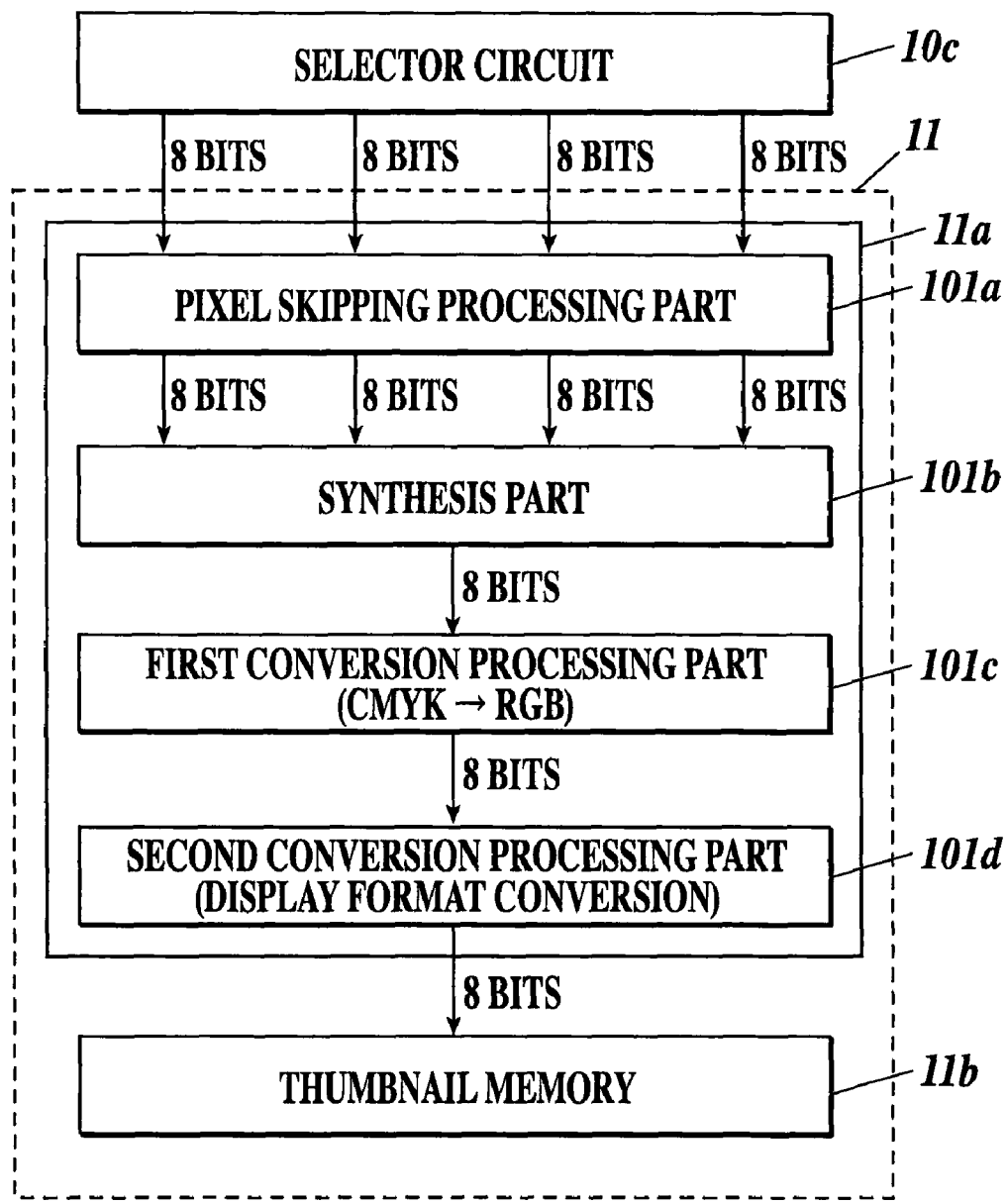
FIG. 3 is a functional block diagram of a thumbnail generating circuit.

Here, a functional block diagram of a thumbnail image processing unit 11a is shown in FIG. 3.

The thumbnail image processing unit 11a comprises a pixel skipping processing part 101a, a synthesis part 101b, a first conversion processing part 101c, and a second conversion processing part 101d.

As shown in FIG. 3, the thumbnail image processing unit 11a performs the processing from the pixel skipping processing part 101a in the upper stream side to the second conversion processing part 101d in the lower stream side for the CMYK image data output from the selector circuit 10c. Then, when all of the processing has been performed to generate the thumbnail image data, the thumbnail image processing unit 11a outputs the generated thumbnail image data to the thumbnail memory 11b.

Hereinbelow, processing in each part of the thumbnail image processing unit 11a is described with reference to FIG. 3 and FIG. 4 which is shown below.

Figure 4:
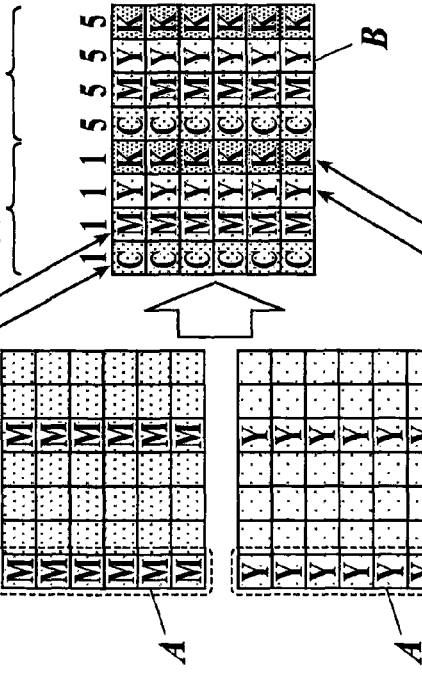
FIG. 4 is a conceptual diagram showing the content of the image processing.
Figure 4:
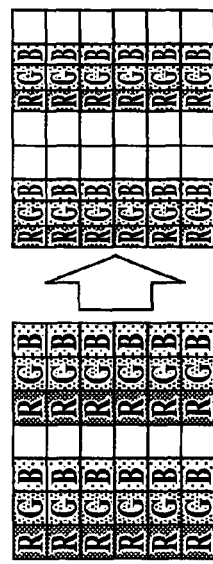
Figure 4:
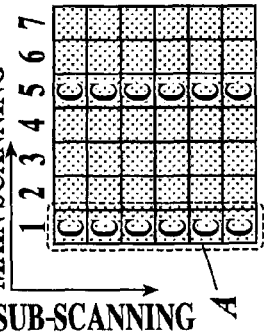
Figure 4:
Figure 4:
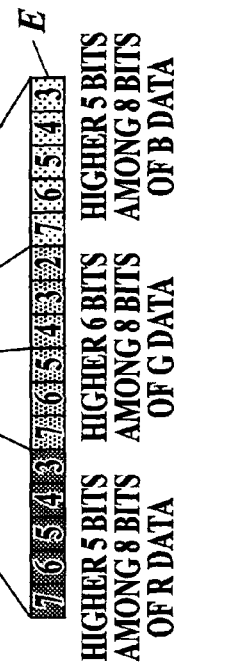

FIG. 4 is a conceptual diagram of the image processing.

The pixel skipping processing part 101a performs the pixel skipping at a rate of ¼ in the main scanning direction for the image data of C, M, Y, and K, respectively.

As shown in FIG. 4, CMYK image data A which has been subjected to the pixel skipping processing comprises pixels of the first pixel, the fifth pixel, the ninth pixel, and so forth, in the main scanning direction.

Incidentally, the rate of the pixel skipping is ¼ here. However, the rate of the pixel skipping is not limited to this as long as the denominator thereof is equal to or more than the number of the pieces of image data of CMYK, which are 4. For example, the rate of the pixel skipping may be ⅕. Alternately, the rate of the pixel skipping may be ⅓ in a case of three-color printing.

Further, the pixel skipping processing in the sub-scanning direction is not performed here. This is because the pixel skipping processing in the sub-scanning direction can be performed in a predetermined pixel skipping rate by the display controller 18a, when the thumbnail image is displayed in the display section 18.

The reducing processing of an image in the main scanning direction is performed by the above described pixel skipping processing.

The synthesis part 101b performs synthesis processing in which the image data of each of C, M, Y, and K which has respectively been subjected to the pixel skipping processing is synthesized so as to be one piece of image data.

The CMYK image data B which has been subjected to the synthesis processing comprises pixels of the first pixel, the fifth pixel, the ninth pixel, and so forth, for each of the C, M, Y, and K in the main scanning direction.

The first conversion processing part 101c converts the CMYK image data which has been subjected to the synthesis processing to the RGB image data which is for displaying. FIG. 4 showing the RGB image data C is a conceptual diagram of the RGB image data after the conversion processing.

To put it concretely, the conversion processing performed here is an arithmetic processing in which the R, G, and B are calculated as follows: R=255−(C+K), G=255−(M+K), B=255−(Y+K). Incidentally, the image data of each of C, M, Y, and K respectively comprises data amount of 8 bits per pixel, and 8 bits are capable of expressing the gradation range of 0 to 255. Accordingly, for example, when the gradations are C=150, K=50, the gradation of R can be expressed as R=255−(150+50)=55.

The second conversion processing part 101d converts the RGB image data according to a display format predetermined by the display of the display section 18. The display format discussed here is one which defines the maximum number of colors (number of bits, arrays, or the like) that can be displayed in the display at the same time. The second conversion processing part 101d creates the RGB image data using the higher-order bits according to the display format for the image data of R, G, and B which respectively has the data amount of 8 bits per pixel. FIG. 4 showing the RGB data D is a conceptual diagram of the image data after the conversion processing.

The RGB image data D which is created in the second conversion processing part 101d is to be used as the thumbnail image data. Incidentally, the image data E indicates the image data of one pixel according to the display format.

As a concrete example of the above described processing performed by the second conversion processing part 101d, a case in which the display format is "RGB565" is described.

The second conversion processing part 101d creates the RGB image data D by using higher 5 bits (2 to the power of 5:32 gradations) for each of R and B, and higher 6 bits (2 to the power of 6:64 gradations) for G, for each pixel of image data of respective R, G, and B. Incidentally, the RGB image data D created based on the display format of "RGB565" can describe at the maximum of 65536 colors (2 to the power of 16) in the display at the same time.

The second conversion processing part 101d outputs the created RGB image data D, that is to say, the thumbnail image data to the thumbnail memory 11b.

Further, the thumbnail image generating section 11 reads out the thumbnail image data from the thumbnail memory 11b to output the read thumbnail image data to the VRAM 18a of the display section 18. The thumbnail image data which has been output to and stored by the VRAM 18a is read out by the display controller 18b according to the operation signal from the operation section 17. Subsequently, the read thumbnail image data is to be displayed on the display.

As described above, the operation signal of the operation section 17 comprises an instruction signal to display the thumbnail image data in the display section 18, for example. Further, as described below, the operation signal further comprises an instruction signal to perform image forming of the CMYK image data, an instruction signal to perform various image processing including reducing processing, magnifying processing, rotating processing, gamma correction, and the like.

Referring back to FIG. 2, when the operation signal so as to instruct printing from the operation section 17 is received, the compression/extension processing unit 10d reads out the CMYK image data from the CMYK memory 10e to perform the extension processing. Consequently, the image data subjected to the extension processing is output to the printing image processing unit 10f.

The printing image processing unit 10f performs instructed various image processing (reducing processing, magnifying processing, and the like) for the CMYK image data according to the operation signal of the operation signal 17. Subsequently, the CMYK image data subjected to the image processing is output to the output device 15.

As described above, according to a preferred embodiment of the present invention, there is provided an image forming apparatus 100, comprising:

an image processing section 10 to perform image processing for printing for CMYK image data which is obtained by a color conversion for the printing;

a thumbnail image generating section 11 to generate thumbnail image data by using the CMYK image data;

a memory 10e to store the CMYK image data; and a display section 18 to display a thumbnail image based on the thumbnail image data, wherein the thumbnail image generating section 11 performs reducing processing to reduce the CMYK image data, and conversion processing to convert the reduced CMYK image data to image data for displaying, so as to generate the thumbnail image data, in parallel with the image processing performed by the image processing section 10.

Thus, the generating processing of the thumbnail images is performed in parallel with the image processing and the like of the CMYK image data, so that the generating processing of the thumbnail images need not be separately performed, and thus the processing can be performed with more efficiency. Further, it becomes possible to quickly display the thumbnail images as a preview for confirmation.

Preferably, the thumbnail image generating section 11 generates the thumbnail image data in a state of being synchronized with the image processing performed by the image processing section 10.

Thus, the processing in which the control section 12 reads out the CMYK image data which is once stored in the CMYK memory 10e, and the like is no longer necessary. Accordingly, the thumbnail images can be generated more efficiently.

Preferably, when the number of a color for the printing is "n", the thumbnail image generating section 11 performs the reducing processing with a pixel skipping rate defined as "1/(not less than n)".

Thus, in the synthesis processing by the synthesis part 101b, the size of the image data need not be enlarged so as to be larger than the size of the original CMYK image data. Accordingly, the time spent for the generating processing of the thumbnail images can be reduced.

Preferably, the thumbnail image generating section 11 converts the CMYK image data comprising four colors which is obtained by the color conversion for the printing to RGB image data comprising three colors for the displaying, so as to perform the conversion processing.

Thus, the thumbnail images can be displayed in the display section 18 with a color shade similar to that of the CMYK image data which is the image data for printing.

Preferably, the thumbnail image generating section 11 converts the reduced CMYK image data which is obtained by the reducing processing to a format for the displaying, the format being predetermined according to the display section 18, so as to perform the conversion processing.

Thus, the thumbnail images can be quickly displayed in the display section 18 by simple conversion processing.

Preferably, the thumbnail image generating section 11 converts the reduced CMYK image data which is obtained by the reducing processing to RGB image data, and further converts the RGB image data to the format for the displaying by using higher bits of the RGB image data.

Thus, the thumbnail images can be quickly displayed in the display section 18 with a color shade similar to that of the CMYK image data.

Preferably, the thumbnail image generating section 11 switches to and from generating and not generating the thumbnail image data, according to whether the CMYK image data is stored in the memory 10e or not.

This will prevent the image forming apparatus from generating unnecessary thumbnail images.

The present U.S. patent application claims a priority under the Paris Convention of Japanese patent application No. 2008-011452 filed on Jan. 22, 2008, which shall be a basis of correction of an incorrect translation.

What is claimed is:

1. An image forming apparatus, comprising:
an image processing section to perform image processing for printing for CMYK image data which is obtained by a color conversion for the printing;
a thumbnail image generating section to generate thumbnail image data by using the CMYK image data;
a memory to store the CMYK image data; and
a display section to display a thumbnail image based on the thumbnail image data, wherein
the thumbnail image generating section performs reducing processing to reduce the CMYK image data, and conversion processing to convert the reduced CMYK image data to image data for displaying, so as to generate the thumbnail image data, in parallel with the image processing performed by the image processing section.

2. The image forming apparatus of claim 1, wherein
the thumbnail image generating section generates the thumbnail image data in a state of being synchronized with the image processing performed by the image processing section.

3. The image forming apparatus of claim 1, wherein
when the number of a color for the printing is "n",
the thumbnail image generating section performs the reducing processing with a pixel skipping rate defined as "1/(not less than n)".

4. The image forming apparatus of claim 1, wherein
the thumbnail image generating section converts the CMYK image data comprising four colors which is obtained by the color conversion for the printing to RGB image data comprising three colors for the displaying, so as to perform the conversion processing.

5. The image forming apparatus of claim 1, wherein
the thumbnail image generating section converts the reduced CMYK image data which is obtained by the reducing processing to a format for the displaying, the format being predetermined according to the display section, so as to perform the conversion processing.

6. The image forming apparatus of claim 5, wherein
the thumbnail image generating section converts the reduced CMYK image data which is obtained by the reducing processing to RGB image data, and further converts the RGB image data to the format for the displaying by using higher bits of the RGB image data.

7. The image forming apparatus of claim 1, wherein
the thumbnail image generating section switches to and from generating and not generating the thumbnail image data, according to whether the CMYK image data is stored in the memory or not.

8. A thumbnail image generating method, comprising:
performing image processing for printing for CMYK image data which is obtained by a color conversion for the printing;
generating thumbnail image data by performing reducing processing to reduce the CMYK image data, and conversion processing to convert the reduced CMYK image data to image data for displaying, in parallel with the image processing;
storing the CMYK image data in a memory; and
displaying a thumbnail image in a display section based on the thumbnail image data.

9. The thumbnail image generating method of claim 8, wherein
in the generating of the thumbnail image data, the thumbnail image data is generated in a state of being synchronized with the performing of the image processing for the printing.

10. The thumbnail image generating method of claim 8, wherein
when the number of a color for the printing is "n",
in the generating of the thumbnail image data, the reducing processing is performed with a pixel skipping rate defined as "1/(not less than n)".

11. The thumbnail image generating method of claim 8, wherein
in the generating of the thumbnail image data, the CMYK image data comprising four colors which is obtained by the color conversion for the printing is converted to RGB image data comprising three colors for the displaying, so as to perform the conversion processing.

12. The thumbnail image generating method of claim 8, wherein
in the generating of the thumbnail image data, the reduced CMYK image data which is obtained by the reducing processing is converted to a format for the displaying, the format being predetermined according to the display section, so as to perform the conversion processing.

13. The thumbnail image generating method of claim 12, wherein
in the generating of the thumbnail image data, the reduced CMYK image data which is obtained by the reducing processing is converted to RGB image data, and the RGB image data is converted to the format for the displaying by using higher bits of the RGB image data.

14. The thumbnail image generating method of claim 8, wherein
in the generating of the thumbnail image data, generating and not generating the thumbnail image data are switched, according to whether the CMYK image data is stored in the memory or not.

* * * * *